Nov. 19, 1957 — P. K. BRIDENBAUGH — 2,813,762
SELF-ALIGNING BEARING
Filed Aug. 13, 1954

INVENTOR.
Paul K. Bridenbaugh
BY
Watson D. Harbaugh
Atty.

United States Patent Office 2,813,762
Patented Nov. 19, 1957

2,813,762

SELF-ALIGNING BEARING

Paul K. Bridenbaugh, Chicago, Ill., assignor, by mesne assignments, to Supreme Products Corporation, Chicago, Ill., a corporation of Illinois Application August 13, 1954, Serial No. 449,738

11 Claims. (Cl. 308—72)

This invention relates to bearings, especially of the self-aligning type used in prime movers such as, for example, small electrical motors.

The main objects of this invention are to provide an improved form of spring-retained bearing element which is very compact and easily assembled; to provide an improved form of spring and mounting relationship for retaining a self-aligning bearing element in a ball-and-socket relationship with the mounting in an area no deeper than the length of the bearing element; and to provide an improved spring-retained self-aligning bearing which is extremely simple in construction with a minimum of parts, hence economical to manufacture, easy to assemble in a snap relationship and disassemble without injury to associated parts, and wherein the spring is disposed and supported inwardly of the plane of its contact with the bearing element.

The essential concept of this invention involves a bearing element having a surface of revolution preferably spherical in contour at one end yieldingly retained in mating relationship with a correspondingly contoured socket in a supporting element by means of a frusto-conically wound helical spring virtually turning inside out with the convolution at the smaller end of the spring engaging the bearing element on the axial side of the largest convolution opposite to that which the convolutions normally occupy when the spring is untensioned and with the larger convolution also tensioned radially inwardly and releasably held within concentrically disposed mounting means on the supporting element.

Figure 4:
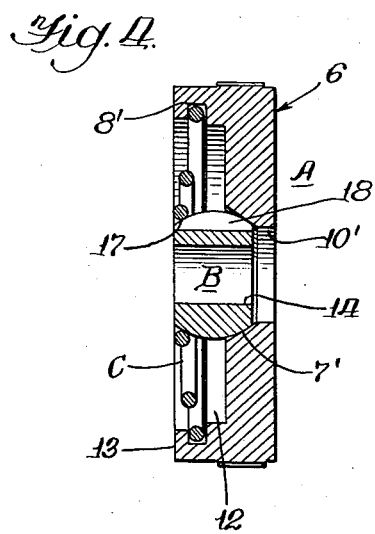
Fig. 4 is a transverse sectional view, similar to Fig. 2, but showing a modified form of mounting.

A self-aligning bearing embodying the foregoing concept comprises a supporting element or mounting A, a bearing element B, and a spring C. The mounting A is shown in two forms, a sheet metal stamping 5 (Figs. 1 and 2) and a machined member 6 (Fig. 4).

Figure 1:
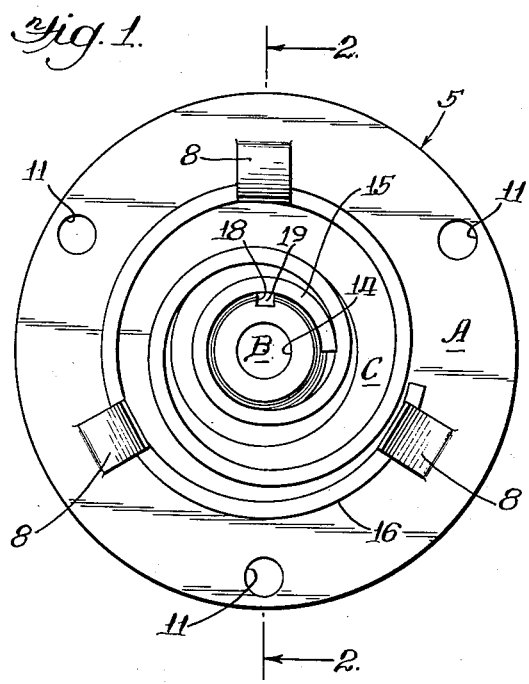
Fig. 1 is a face view of one adaptation of an improved thrust bearing constructed in accordance with this invention.
Figure 2:
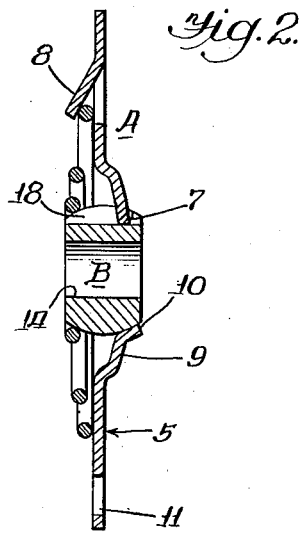
Fig. 2 is a transverse sectional view taken on the plane of the line 2—2 of Fig. 1.

In the sheet-metal stamping shown in Figs. 1 and 2 the disc 5 is axially apertured and upset to form a seat 7 and spring-retaining means 8. The seat 7, of a concave form preferably spherical in shape, is located in a hub offset 9 concentric with the axial opening 10. The spring-retaining means 8 is in the form of three tongues or lugs uniformly spaced from each other concentrically about the axis of the disc 5 and struck out from the face of a motor end bell, frame or bracket represented herein as a disc 5 in a direction opposite the hub offset 9. They are open toward the axis of the disc 5.

Intermediately, and radially outwardly from the spring-retaining tongues 8, apertures 11 are formed whereby the disc 5 may be secured to some suitable frame work (not shown).

The machined adaptation 6 (Fig. 4) is recessed at 12 inwardly from the face 13 to permit the forming of a seat 7' and a spring-retaining means 8' located in radially-spaced relationship to each other. The seat 7' in this instance is frusto-conical in form concentric with an axial opening 10'. The spring-retaining means 8' is in the form of an annular groove located axially intermediate the seat 7' and the recessed face 13. In both embodiments the spring-retaining means may be located axially within the length of the bearing element B.

The bearing element B or B' here is shown preferably in the form of an oblate spheroid of a diameter that permits it to so engage the seat 7 or 7' as to constitute an effective ball-and-socket joint. It has an axial bore 14 for the reception of the rotor shaft (not shown) for which the element B serves as a bearing. An external groove 18 extending lengthwise of the bearing element B may be provided to engage an ear 19 upset or struck in offset relationship from the stock defining the socket in the mounting A to prevent relative rotation between the bearing and mounting. However, the shear at the ends of the spring leaving a tang 17 and the tension-reaction of the spring is adequate to prevent relative rotation particularly when the groove 18 is provided.

Figure 3:
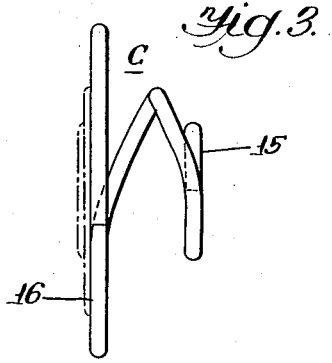
Fig. 3 is a side view of the improved form of spring for a self-aligning bearing of this kind, showing in full outline its expanded or normal form and in dotted outline its tensioned form as assembled in the other figures.

The spring C is of frusto-conical helically-wound form with from two-and-one-half to three convolutions provided therein in its resting form. It is constructed so that in its normal untensioned form the smaller convolution 15 is disposed at an axial distance from the larger convolution 16 (Fig. 3) but permits this normal relationship to be reversed or turned somewhat inside out for holding the bearing element B or B' on the mounting seat 7 or 7' when the larger convolution is secured to the retaining means 8 or 8' under radially compressive strains clearly shown in the drawings.

To assemble this self-aligning bearing, the bearing element B is placed on the mounting seat 7 or 7' and the spring C then has the smaller convolution 15 placed over the exposed end of the bearing element B. The larger convolution 16 is then contracted circumferentially to slip under the tongues 8 or into the groove 8' to rest there.

It will be obvious from the drawings that a self-aligning bearing constructed in accordance with this invention fulfills the objects stated and is so compact that all of the parts are disposed with an annular space of an axial dimension no greater, and generally much less than, the maximum axial thickness of the mounting A and/or element B. This will permit the use of the bearing in a space of much lesser limits than any of the prior types of spring-retained self-aligning bearings. Moreover, it will be apparent to those skilled in the art that various and further changes and modifications can be made without departing from the spirit of the invention, the scope of which is commensurate with the appended claims.

What is claimed is:

1. A self-aligning bearing comprising, a disc formed with an axially-disposed seat, retainer means formed on the disc in axially-spaced relationship to the seat and open toward the axis of the disc and facing toward said seat, a bearing element having a spherical surface contacting the seat to constitute a ball-and-socket joint and extending axially beyond said retainer means at the other end, and a frusto-conical helically wound spring the larger and smaller convolutions of which respectively are so dimensioned that with the former in contact with the retainer means the latter is placed under an axial tension to engage said other end and press the element toward the seat whereby the element is held in self-aligning relationship with the disc seat.

2. A self-aligning bearing comprising, a disc formed with an axially-disposed seat, retainer means formed on the disc in axially-spaced relationship to the seat and open toward the axis of the disc and facing toward said seat, an oblate spheroid element of an axial dimension greater than the axial spacing of the seat and the retainer means and contacting the seat to constitute a ball-and-socket joint, and a frusto-conical wire spring the larger and smaller convolutions of which respectively are so dimensioned that with the former in contact with the retainer means the latter engages and presses the element toward the seat under axial tension whereby the element is held in operative relationship with the disc seat.

3. A self-aligning bearing comprising, a disc formed with an axially-disposed seat, retainer means formed on the disc in radially-spaced relationship to the seat and open toward the axis of the disc and facing said seat, an oblate spheroid element of an axial dimension greater than the axial dimension of the disc and contacting the seat to constitute a ball-and-socket joint, and a frusto-conical spring the larger and smaller convolutions of which respectively are so dimensioned that with the former in contact with the retainer means the latter contacts the element on a plane spaced axially outward of the plane of the retainer means whereby the element is pressed inwardly into operative relationship with the disc seat, the seating position of said smaller convolution of the spring being normally disposed inwardly of said larger convolution before the larger convolution is placed in contact with the retainer means.

4. A self-aligning bearing comprising, a mounting disc formed with an axially-disposed seat, retainer means formed on the disc in axially-and-radially-spaced relationship to the seat and open toward the axis of the disc and facing said seat, an oblate spheroid element of an axial dimension greater than the axial spacing of the seat and the retainer means and contacting the seat to constitute a ball-and-socket joint, said oblate spheroid element having a groove on the outer surface extending longitudinally thereof, and a frusto-conical helically-wound wire spring the larger and smaller convolutions of which respectively are so dimensioned that with the former in contact with the retainer means the latter contacts the element with the plane of the smaller convolution on the opposite side of the plane of the larger convolution from that which the convolutions normally occupy when the spring is untensioned axially whereby the element is pressed into operative relationship with the disc seat.

5. A self-aligning bearing comprising, a mounting disc formed with a seat offset at one side of the plane of the disc, an anular series of shoulders oppositely offset from the plane of the disc and open toward the axis of the disc and facing said seat, an oblate spheroid element of an axial dimension greater than the axial spacing of the seat and the shoulders facing the seat to constitute a ball-and-socket joint, and a frusto-conical helically-wound spring the larger and smaller convolutions of which respectively are so dimensioned that with the larger in contact with the shoulders under radial tension the smaller is displaced to the opposite side of the larger from that normally occupied and contacts the element to exert axial pressure whereby the element is held firmly in self-aligning relationship with the mounting disc seat.

6. A self-aligning bearing comprising, a mounting formed with an axially disposed seat, an annular shoulder offset axially from said seat and open toward the axis of the seat and facing the seat, a bearing element having a spheroid surface of an axial dimension greater than the axial spacing of the seat and the shoulder facing the seat to constitute a ball-and-socket joint, and a frusto-conical spring the larger and smaller convolutions of which respectively are so dimensioned that with the larger in contact with the shoulder and smaller contacts the element on a plane disposed oppositely relative to the larger from the plane normally defined by the smaller whereby the element is held under resilient pressure in operative relationship with the seat.

7. A self-aligning bearing comprising, a disc formed with a seat offset at one side of the plane of the disc, an annular series of shoulders oppositely offset from the plane of the disc and open toward the axis of the disc and facing the seat, an oblate spheroid bearing element of an axial dimension greater than the axial spacing of the seat and the shoulders facing the seat to constitute a ball-and-socket joint, and a frusto-conical wire spring the larger and smaller convolutions of which respectively are so dimensioned that with the former in contact with the shoulders the latter contacts the element with the plane of the smaller convolution on the opposite side of the plane of the larger convolution from that which the convolutions normally occupy when the spring is untensioned axially whereby the element is held in operative relationship with the disc seat.

8. A self-aligning bearing comprising, a mounting recessed inwardly from one face thereof and formed with an axially-disposed seat inwardly from the one face and an internal groove intermediate the plane of the seat and the one face, an oblate spheroid of an axial dimension greater than the axial spacing of the seat and the one face of the mounting contacting the seat to form a ball-and-socket joint, and a frusto-conical spring the larger and smaller convolutions of which respectively are so dimensioned that with the former in contact with the groove the latter contacts the oblate spheriod under axial tension whereby the spheroid is held in operative relationship with the seat.

9. A self-aligning bearing comprising, a mounting recessed inwardly from one face thereof to form an axially-disposed seat inwardly from said face and an internal groove intermediate the plane of the seat and the said face, an oblate spheroid of an axial dimension greater than the axial spacing of the seat and said face contacting the seat to form a ball-and-socket joint, and a frusto-conical helically-wound spring the larger and smaller convolutions of which respectively are so dimensioned that with the larger in contact with the groove the smaller contacts the spheroid on a plane spaced axially outward of the plane of the groove whereby the spring is turned inside out to hold the spheroid in operative relationship with the seat under resilient tension.

10. A self-aligning bearing comprising a mounting recessed inwardly from one face thereof to form an axially disposed seat and having an internal groove spaced radially and axially from said seat, an oblate spheroid of an axial dimension greater than the axial spacing between the seat and said groove and contacting the seat to form a ball-and-socket joint, and a frusto-conical helically-wound spring the larger and smaller convolutions of which are so dimensioned that with the larger in contact with the groove the smaller contacts the spheroid element on a plane spaced axially outward of the plane of the groove whereby the spring is turned inside out to press the spheroid element into operative relationship with the seat.

11. A self-aligning bearing comprising a mounting recessed inwardly from one face to form a seat having an axis disposed perpendicularly to the plane of the mounting, an internal groove formed in the mounting intermediate the plane of the seat and the said face, a bearing element having a spherical surface forming a ball-and-socket joint with said seat, said element having an axial dimension greater than the axial spacing between the seat and the groove and extending substantially to the plane of said face, and a frusto-conical helically-wound spring the larger and smaller convolutions of which respectively are disposed so that with the larger in contact with the groove the smaller contacts the bearing element in a plane spaced axially outward from the plane of the groove and substantially within the plane of said face.

References Cited in the file of this patent

UNITED STATES PATENTS

| | | |
|---|---|---|
| 2,448,500 | Turner | Aug. 31, 1948 |
| 2,607,819 | Sutton | Aug. 19, 1952 |

FOREIGN PATENTS

| | | |
|---|---|---|
| 363,410 | Germany | June 30, 1921 |